(12) United States Patent
Gerst et al.

(10) Patent No.: US 6,727,327 B1
(45) Date of Patent: Apr. 27, 2004

(54) AQUEOUS N-BUTYL ACRYLATE COPOLYMER DISPERSIONS FOR USE AS LAMINATING ADHESIVES

(75) Inventors: Matthias Gerst, Neustadt (DE); Alexander Centner, Rödersheim-Gronau (DE); Karl-Heinz Schumacher, Neustadt (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/926,082

(22) PCT Filed: Feb. 24, 2000

(86) PCT No.: PCT/EP00/01537
§ 371 (c)(1),
(2), (4) Date: Aug. 27, 2001

(87) PCT Pub. No.: WO00/50480
PCT Pub. Date: Aug. 31, 2000

(30) Foreign Application Priority Data

Feb. 25, 1999 (DE) .......................... 199 08 183

(51) Int. Cl.⁷ .............. C08F 2/38; C08F 2/24; C08F 4/32; C08F 220/06; C08F 220/12
(52) U.S. Cl. .......................... 526/78; 524/458; 526/201; 526/224; 526/227; 526/318.44
(58) Field of Search .................. 526/224, 318.44; 524/458, 78, 201, 227

(56) References Cited

U.S. PATENT DOCUMENTS

| | | | |
|---|---|---|---|
| 2,976,203 A | * 3/1961 | Young et al. | 524/15 |
| 2,976,204 A | * 3/1961 | Young et al. | 156/332 |
| 5,474,638 A | 12/1995 | Kohlhammer et al. | |
| 6,376,094 B1 | * 4/2002 | Dames et al. | 428/514 |

FOREIGN PATENT DOCUMENTS

| | | | |
|---|---|---|---|
| DE | 196 49 383 | 6/1998 | |
| DE | 197 38 185 | 3/1999 | |
| EP | 0 900 651 | 3/1999 | |
| EP | 950 698 | 10/1999 | |
| WO | WO 92/12213 | 7/1992 | |
| WO | WO 9823656 A1 | * 6/1998 | C08F/220/12 |

* cited by examiner

*Primary Examiner*—Kelechi C. Egwim
(74) *Attorney, Agent, or Firm*—Oblon, Spivak, McClelland, Maier & Neustadt, P.C.

(57) ABSTRACT

The present invention provides aqueous polymer dispersions comprising at least one particulate polymer P having a glass transition temperature $T_g$ of less than 0° C. which is composed of ethylenically unsaturated monomers M including:

i. from 60 to 94.9% by weight, preferably from 75 to 89.5% by weight, of n-butyl acrylate as monomer M1,
ii. from 5 to 39.9% by weight, preferably from 10 to 24.5% by weight, of at least one monomer M2 selected from esters of methacrylic acid with $C_1$ to $C_4$ alkanols, tert-butyl acrylate, and vinylaromatic monomers, and
iii. from 0.1 to 5% by weight, preferably from 0.5 to 2% by weight, of at least one monomer M3 selected from ethylenically unsaturated compounds having at least one acid group;
the proportions of said monomers M1 to M3 being based on 100% by weight of monomers M, obtainable by free-radical aqueous emulsion polymerization of monomers M in the presence of at least 0.01% by weight, based on the weight of the monomers M, of at least one molecular weight regulator. The present invention also provides for the use of such polymer dispersions in adhesive formulations for producing laminates, a process for producing laminates, and the laminates obtainable by this process.

21 Claims, No Drawings

AQUEOUS N-BUTYL ACRYLATE COPOLYMER DISPERSIONS FOR USE AS LAMINATING ADHESIVES

The present invention relates to aqueous polymer dispersions and to their use in aqueous adhesive formulations for producing laminates.

The use of aqueous polymer dispersions as adhesives and in aqueous adhesive formulations is known to the skilled worker. They have the advantage over solvent-based adhesives that it is possible in principle to avoid solvent waste and solvent emissions.

In practice, adhesives for producing laminates, which are also referred to as laminating adhesives, have to meet a large number of different requirements. For example, laminating adhesives are desired to be universally applicable; in other words, they should be equally suitable for the bonding of different polymer films made, for example, from polyethylene (PE), oriented polypropylene (OPP), polyamide (PA) or polyethylene terephthalate (PETP) with one another, with aluminum foils or metallized polymer films, and for bonding polymer films with paper.

The laminating adhesives should have good substrate adhesion and after lamination should bring about a high and durable level of strength in the resulting laminates (film composites). Furthermore, a high level of instant strength of the film composite is desirable in order to permit rapid further processing, especially in the case of multi-ply laminates. Processing in the laminating units, furthermore, requires the dispersions to be of high shear stability and have good flow properties.

The aqueous polymer dispersions available commercially to date still do not go far enough toward meeting the requirements to which laminating adhesives are subject.

Wo 92/12213 and EP-A 622 434 disclose laminating adhesives based on aqueous polymer dispersions comprising in copolymerized form both at least one ethylenically unsaturated carboxylic acid and at least one ethylenically unsaturated sulfonic acid. Because of this acid combination, such adhesives lead to comparatively high laminate strength. Ethylenically unsaturated sulfonic acids, however, are comparatively expensive and in many countries do not have approval under food law, so that replacement of these monomers in polymers for laminating adhesives is desirable.

DE-A 196 49 383 and the application DE 197 38 185.5, whose priority date is earlier than that of the present specification, describe aqueous polymer dispersions based on alkyl acrylates and their use as laminating adhesives. The adhesives described result in good instant strength of the laminates.

The application DE 19816742, whose priority date is earlier than that of the present specification, discloses aqueous laminating adhesive formulations whose polymers carry anhydride groups. For optimum bonding, amino-containing crosslinkers must be added to the dispersions during formulation. Two-component adhesive formulations of this kind (2K systems) are of course more awkward to prepare than those consisting of the polymer dispersion as the only adhesive component (1K systems). Furthermore, 2K systems are often not sufficiently stable on storage.

It is an object of the present invention to provide aqueous polymer dispersions which, as laminating adhesives, bring about improved laminate strength relative to the prior art without the need for crosslinkers or monomers containing sulfonic acid groups.

We have found that this object is achieved and that aqueous polymer dispersions composed essentially of n-butyl acrylate lead to particularly stable laminates having good permanent and instant strength if the polymers are prepared in the presence of small amounts of a polymerization regulator.

The present invention accordingly provides aqueous polymer dispersions comprising at least one particulate polymer P having a glass transition temperature $T_g$ of less than 0° C. Whiz is composed of ethylenically unsaturated monomers M including:

i. from 60 to 94.9% by weight, preferably from 75 to 89.5% by weight, of n-butyl acrylate as monomer M1, ii. from 5 to 39.9% by weight, preferably from 10 to 24.5% by weight, of at least one monomer M2 selected from esters of methacrylic acid with $C_1$ to $C_4$ alkanols, tert-butyl acrylate, and vinylaromatic monomers, and iii. from 0.1 to 5% by weight, preferably from 0.5 to 2% by weight, of at least one monomer M3 selected from ethylenically unsaturated compounds having at least one acid group, the propportions of said monomers M1 to M3 being based on 100% by weight of monomers M, obtainable by free-radical aqueous emulsion polymerization of monomers M in the presence of at least 0.01% by weight, based on the weight of the monomers M, of at least one molecular weight regulator. The present invention also provides for the use of such polymer dispersions in adhesive formulations for producing laminates, and the corresponding laminating adhesives.

Among the polymer P dispersions of the invention, preference is given to those obtainable by polymerizing the monomers M in the presence of at least 0.05% by weight and not more than 0.5% by weight, preferably in the presence of from 0.1 to 0.5% by weight, in particular from 0.15 to 0.4 and especially from 0.2 to 0.3% by weight, based on 100 parts by weight of the monomers M to be polymerized, of at least one molecular weight regulator. It is supposed that even small amounts of molecular weight regulators suppress the polymer crosslinking reactions that always take place to a, minor extent in the course of free-radical, addition polymerization. In general, the K value of the polymers P in the latex obtained does not exceed a value of 90 (K value according to Fikentscher determined in a 1% by weight solution of the polymer in tetrahydrofurane.

Typical molecular weight regulators are organic sulfur compounds, halogenated hydrocarbons, silanes, allyl alcohols, and aldehydes. Molecular weight regulators given preference in accordance with the invention are compounds having at least one thiol group such as thioglycolic acid, ethyl thioglycolate, mercaptoethanol, mercaptopropyl-trimethoxysilane, and linear or branched alkyl mercaptans such as tert-butyl mercaptan and tert-dodecyl mercaptan. The regulator is added to the polymerization vessel preferably continuously during the polymerization of the monomers M. Preferably, both the major amount of the monomers M to be polymerized and the major amount of the molecular weight regulator are supplied continuously to the polymerization reaction. The molecular weight regulator is preferably supplied continuously to the polymerization reaction in the form of a separate, preferably aqueous solution or together with the monomers, e.g., in an aqueous monomer emulsion.

The vinylaromatic monomers specified as monomers M2 include styrene, a-methylstyrene, ortho-chlorostyrene, and vinyltoluene. The esters of methacrylic acid with $C_1$–$C_4$ alkanols include methyl methacrylate, ethyl methacrylate, isopropyl methacrylate, n-butyl methacrylate, isobutyl methacrylate, and tert-butyl methacrylate.

Preferred monomers M2 are methyl methacrylate and styrene.

Monomers M3 include monomers which contain at least one acidic group and the anhydrides and salts of such monomers. Monomers M3 include α,β-monoethylenically unsaturated mono- and dicarboxylic acids, monbesters of α,β-monoethylenically unsaturated dicarboxylic acids, the anhydrides of said α,β-monoethylenically unsaturated carboxylic acids, and also ethylenically unsaturated sulfonic acids, phosphonic acids or dihydrogen phosphates and the water-soluble salts thereof, e.g., their alkali metal salts. Preferred monomers M3 are α,β-monoethylenically unsaturated $C_3$–$C_8$ carboxylic, acids and $C_4$–$C_8$ dicarboxylic acids, examples being itaconic acid, crotonic acid, vinylacetic acid, acrylamidoglycolic acid, acrylic acid and methacrylic acid, and also the anhydrides thereof. Particularly preferred monomers M3 are acrylic acid and methacrylic acid.

In addition to the abovementioned monomers M1 to M3 the monomers M may also include further, auxiliary monomers. Examples of these include neutral or nonionic, modifying monomers M4 of increased solubility in water, e.g., the amides or the N-alkylolamides of the abovementioned carboxylic acids, examples being acrylamide, methacrylamide, N-methylolacrylamide and N-methylolmethacrylamide, and also the hydroxyalkyl esters of the abovementioned α,β-monoethylenically unsaturated carboxylic acids, such as hydroxyethyl acrylate, hydroxyethyl methacrylate, hydroxypropyl acrylate and hydroxypropyl methacrylate. Further suitable auxiliary monomers M4 are the nitriles of α,β-monoethylenically unsaturated $C_3$–$C_8$ carboxylic acids, such as acrylonitrile or methacrylonitrile. The monomers M generally include less than 5% by weight, in particular less than 2% by weight, of monomers M4. The total amount of monomer M3 and monomer M4 is typically less than 5% by weight based on the total monomer amount.

Furthermore, the polymers P may also include bifunctional monomers M5, containing not only an ethylenically unsaturated double bond but also at least one glycidyl or carbonyl group. Examples of monomers M5 are ethylenically unsaturated glycidyl ethers and glycidyl esters: for example, vinyl, allyl and methallyl glycidyl ether, glycidyl acrylate and glycidyl methacrylate, the diacetonylamides of the abovementioned ethylenically unsaturated carboxylic acids, e.g., diacetone(meth)acrylamide, and the esters of acetylacetic acid with the abovementioned hydroxyalkyl esters of ethylenically unsaturated carboxylic acids, an example being acetylacetoxyethyl (meth)acrylate. Monomers M5, like the anhydrides of α,β-monoethylenically unsaturated mono- and dicarboxylic acids specified as monomers M3, allow the subsequent crosslinking of the polymers P of the invention with, for example, polyfunctional amines, hydrazides or alcohols.

Furthermore, a portion of the n-butyl acrylate can be replaced by other esters of acrylic acid with $C_1$–$C_{10}$ alkanols or with $C_5$–$C_{10}$ cycloalkanols, such as ethyl acrylate, 2-ethylhexyl acrylate and cyclohexyl acrylate, the fraction of these acrylates other than n-butyl acrylate and tert-butyl acrylate being less than 20% by weight and, in particular, less than 10% by weight based on the total monomer amount.

The polymer P is preferably composed exclusively of the monomers M1, M2 and M3. The monomers M3 preferably include no anhydrides of α,β-monoethylenically unsaturated mono- and dicarboxylic acids. In one particularly preferred embodiment the polymer P is composed of:

i. from 70 to 94.9% by weight, in particular from 80 to 89.5% by weight, of n-butyl acrylate, ii. from 5 to 29.9% by weight, in particular from 10 to 19.5% by weight, of methyl methacrylate and/or styrene, and iii. from 0.1 to 5% by weight, in particular from 0.5 to 2% by weight, of α,β-monoethylenically unsaturated monocarboxylic acid, especially acrylic acid and/or methacrylic acid, the weight fractions of the monomers adding up to 100% by weight.

The glass transition temperature $T_g$ of the polymers P present in the dispersions of the invention is preferably in the range from –60° C. to –10° C., in particular in the range from –50° C. to –15° C., and especially in the range from –40° C. to –20° C. In this context it proves useful to estimate the glass transition temperature $T_g$ of the dispersed polymer. According to Fox (T.G. Fox, Bull. Am. Phys. Soc. (Ser. II) 1, 123 [1956] and Ullmanns Enzyklopädie der technischen Chemie, Weinheim (1980), pp. 17, 18), for the glass transition temperature of copolymers at high molecular masses, it holds in good approximation that $$\frac{1}{T_G} = \frac{X^1}{T_g^1} + \frac{X^2}{T_g^2} + \ldots \frac{X^n}{T_g^n}$$

where $X^1, X^2, \ldots, X^n$ are the mass fractions of the monomers $1, 2, \ldots, n$ and $T_g^1, T_g^2, \ldots, T_g^n$ are the glass transition temperatures of the homopolymers of each of the monomers $1, 2, \ldots, n$ in degrees Kelvin. The latter are known, for example, from Ullmann's Encyclopedia of Industrial Chemistry, VCH, Weinheim, Vol. A 21 (1992) p. 169 or from J. Brandrup, E. H. Immergut, Polymer Handbook $3^{rd}$ ed, J. Wiley, New York 1989.

It has also been found advantageous for the polymer particles of the polymer P in the polymer dispersions of the invention to have an average particle diameter in the range from 50 to 1000 nm (as determined using an ultracentrifuge or by photon correlation spectroscopy; on particle size determination see W. Mächtle, Angew. Makromolekulare Chemie 185 (1984), 1025–1039 and W. Mächtle, op. cit. 162 (1988), 35–42). In the case of formulations with high solids contents, e.g., >50% by weight based on the total weight of the formulation, it is advantageous on grounds of viscosity for the weight-average particle diameter of the polymer particles in the dispersion to be at least 100 nm. The average particle diameter will preferably not exceed 600 nm. It has also been found advantageous for the particle diameters of the individual polymer particles to vary over a wide range, and in particular for the size distribution to have two or more maxima (polymer dispersions having bimodal or polymodal polymer particle size distribution). Measures to adjust the polymer particle size distribution are known to the skilled worker (see, for example, EP-A 614 922 and documents cited therein).

The solids content of the polymer dispersions of the invention is typically in the range from 30 to 75% by weight and preferably in the range from 40 to 70% by weight. For the use in accordance with the invention it is of advantage if the solids content is as high as possible, i.e., at least 50% by weight.

The aqueous polymer dispersions employed in accordance with the invention are prepared in accordance with the invention by free-radical aqueous emulsion polymerization of said monomers M in the presence of the aforementioned amounts of at least one molecular weight regulator. The emulsion polymerization is customarily conducted in an aqueous polymerization medium in the presence of at least one free-radical polymerization initiator and, if desired, of a surface-active substance.

Suitable free-radical polymerization initiators in principle include both peroxides, such as hydrogen peroxide, organic peroxides such as tert-butyl hydroperoxide, alkali metal and ammoniumperoxodisulfates, for example, and azo compounds. It is preferred to use redox initiator systems, which are composed of at least one organic reducing agent and at least one peroxide and/or hydroperoxide, an example being tert-butyl hydroperoxide and a sulfur compound, such as the sodium salt of hydroxymethanesulfinic acid, sodium sulfite, sodium disulfite, sodium thiosulfate or acetone bisulfite adduct, or hydrogen peroxide with ascorbic acid. For this purpose it is also possible to use redox initiator systems containing a small amount of a metal compound which is soluble in the polymerization medium and whose metallic component is able to exist in a plurality of valence states, an example being ascorbic acid/iron(II) sulfate/hydrogen peroxide, in which the ascorbic acid can in many cases also be replaced by the sodium salt of hydroxymethanesulfinic acid, acetone bisulfite adduct, sodium sulfite, sodium hydrogen sulfite or sodium disulfite, and the hydrogen peroxide by organic peroxides, such as tert-butyl hydroperoxide, alkali metal peroxodisulfates and/or ammonium peroxodisulfate. Likewise preferred initiators are peroxodisulfates, such as sodium peroxodisulfate or ammonium peroxodisulfate. Preferably, the amount of free-radical initiator systems employed, based on the total amount of monomers to be polymerized, is from 0.1 to 2% by weight.

The initiator can either be all included in the initial charge to the polymerization vessel or else added continuously or in stages at the rate at which it is consumed in the course of the free-radical aqueous emulsion polymerization. In each individual case it will depend, in a manner known to the skilled worker, both on the chemical nature of the initiator system and on the polymerization temperature. Preferably, a portion is included in the initial charge and the remainder is supplied to the polymerization vessel at the rate at which it is consumed.

Surface-active substances suitable for conducting the emulsion polymerization are the emulsifiers and protective colloids commonly employed for such purposes. The surface-active substances are customarily used in amounts of up to 10% by weight, preferably from 0.1 to 5% by weight and, in particular, from 0.5 to 4% by weight, based on the monomers to be polymerized. The surface-active substances do of course remain in the polymer dispersions and are therefore also a constituent of the laminating adhesives of the invention.

Examples of suitable protective colloids are polyvinyl alcohols, starch derivatives and cellulose derivatives, or vinylpyrrolidone copolymers. A detailed description of further suitable protective colloids can be found in Houben-weyl, Methoden der organischen Chemie, Volume XIV/1, Makromolekulare Stoffe [Macromolecular substances], Georg-Thieme-Verlag, Stuttgart 1961, pp. 411–420. Mixtures of emulsifiers and/or protective colloids can also be used. As surface-active substances it is preferred to employ exclusively emulsifiers, whose relative molecular weights, unlike those of the protective colloids, are usually below 2000. They can be anionic, cationic or else nonionic in nature.

The anionic emulsifiers include alkali metal and ammonium salts of alkyl sulfates (alkyl: $C_8$–$C_{12}$), of dialkyl esters of sulfdsuccinic acid (alkyl: $C_4$–$C_{10}$), of sulfuric monoesters with ethoxylated alkanols (EO units: 2 to 50, alkyl: $C_{12}$ to $C_{18}$) and with ethoxylated alkylphenols (EO units: 3 to 50, alkyl: $C_4$–$C_{10}$), of alkylsulfonic acids (alkyl: $C_{12}$–$C_{18}$) and of alkylarylsulfonic acids (alkyl: $C_9$ to $C_{18}$). The anionic surface-active substances also include mono- and dialkyl derivatives of sulfonylphenoxybenzenesulfonic salts, especially their sodium, potassium or calcium salts. The alkyl groups in these compounds generally have 6 to 18 and especially 6, 12 or 16 carbon atoms. Use is frequently made of technical mixtures comprising a proportion of from 50 to 90% by weight of the monoalkylated product. These compounds are common knowledge, for example, from U.S. Pat. No. 4,269,749, and are obtainable commercially, for example, as Dowfax® 2A1 (trademark of the Dow Chemical Company).

Suitable nonionic emulsifiers are araliphatic or aliphatic nonionic emulsifiers, examples being ethoxylated mono-, di- and trialkylphenols.(EO units: 3 to 50, alkyl: $C_4$–$C_9$), ethoxylates of long-chain alcohols (EO units: 3 to 50, alkyl: $C_8$–$C_{36}$), and also polyethylene oxide/polypropylene oxide block copolymers. Preference is given to ethoxylates of long-chain alkanols (alkyl: $C_{10}$–$C_{22}$, average degree of ethoxylation: 3 to 50) and, of these, particular preference to those based on oxo alcohols and naturally occurring alcohols having a linear or branched $C_{12}$–$C_{18}$ alkyl radical and a degree of ethoxylation of from 8 to 50.

Further suitable emulsifiers can be found in Houben-Weyl, Methoden der organischen Chemie, Volume XIV/1, Makromolekulare Stoffe [macromolecular substances], Georg-Thieme-Verlag, Stuttgart, 1961, pp. 192–208.

The surface-active substances used to prepare the polymer dispersions of the invention preferably include at least one anionic emulsifier. It has been found advantageous for the stability of the polymer dispersions of the invention, especially to mechanical loads such as shear forces, for the anionic emulsifiers preferably used to prepare the dispersions of the invention to include at least one salt of a dialkyl ester of sulfosuccinic acid (linear or branched $C_4$–$C_{10}$ and, in particular, $C_8$ alkyl radical), preferably an alkali metal salt and in particular the sodium salt.

The emulsion polymerization takes place in general at from 30 to 130, preferably from 50 to 90° C. A K value <90 can also be achieved by polymerization at temperatures above 80° C., preferably above 90° C. and, in particular, above 100° C.

The polymerization medium can consist either of water alone or else of mixtures of water with water-miscible organic liquids such as methanol, ethanol, n-propanol, isopropanol, n-butanol, tert-butanol, tetrahydrofuran, formamide, or dimethylformamide, the proportion of said liquids usually being less than 10% by weight based on the polymerization medium. It should be borne in mind here that the presence of alcohols during the polymerization may result in a reduction in molecular weight. Preferably, water alone is used as polymerization medium.

The emulsion polymerization can be conducted either as a batch process or in the form of a feed process, including stages or a gradient procedure. Preference is given to the feed process, in which the monomers in pure or emulsified form are supplied to the polymerization zone continuously, in stages or under a concentration gradient, with the polymerization being maintained. The individual components can be added to the reactor, in the case of the feed process, from above, from the side or from below, through the reactor floor.

Besides the seed-free preparation route, a defined polymer particle size can be established by conducting the emulsion polymerization by the seed latex process or in the presence of seed latex prepared in situ. Corresponding processes are known and can be found in the prior art (see EP-B 40 419, EP-A-614 922, EP-A-567 812 and literature cited therein and also 'Encyclopedia of Polymer Science and Technology', Vol. 5, John Wiley & Sons Inc., New York 1966, p. 847).

In the case of the seed latex process, the polymerization is customarily conducted in the presence of from 0.001 to 3% by weight and, in particular, from 0.01 to 1.5% by weight of a seed latex (solids content of the seed latex, based on total monomer amount), preferably with seed latex included in the initial charge (initial charge seed). The latex generally has a weight-average particle size of from 10 to 100 nm and, in particular, from 20 to 50 nm. Examples of its constituent monomers are styrene, methyl methacrylate, n-butyl acrylate and mixtures thereof, it being possible for the seed latex to include in copolymerized form a minor fraction of monomers M3 and/or M4 as well, preferably less than 10% by weight based on the total weight of the polymer particles in the seed latex.

In order to remove the residual monomers it is common following the polymerization to carry out physical deodorization, by distilling off the volatile monomers with steam, for example, or chemical deodorization, in which case, after the end of the emulsion polymerization proper—that is, after a monomer conversion of at least 95%, or after the residual monomer content has been lowered to a level <5% by weight by physical deodorization—further initiator is added, such as a redox initiator, for example.

The polymer dispersions of the invention are used in accordance with the invention in aqueous adhesive formulations for producing laminates; i.e., in aqueous laminating adhesive formulations for bonding substrates of large surface area. The present invention therefore also provides a process for producing laminates in which an aqueous adhesive formulation is used which comprises at least one of the polymer dispersions of the invention. In this context, the aqueous polymer dispersions can be used as they are or after formulation with customary auxiliaries. Examples of customary auxiliaries are wetting agents, thickeners, protective colloids, light stabilizers, and biocides. With the adhesive formulations of the invention there is no need to add plasticizing resins (tackifiers) or other plasticizers.

In the process of the invention for producing laminates, the polymer dispersion of the invention, or an appropriately formulated preparation (formulation), is applied to the substrates of large surface area that are to be bonded, preferably in a layer thickness of from 0.1 to 20, with particular preference from 1 to 7 g/m² by means, for example, of knife coating, brushing, etc. After a short time for evaporation of the dispersion water (preferably after from 1 to 60 seconds), the coated substrate can then be laminated with a second substrate, in which case the temperature can be, for example, from 20 to 200, preferably from 20 to 100° C. and the pressure can be, for example, from 100 to 3000, preferably from 300 to 2000 kN/m².

Examples of suitable substrates are polymer films, especially those of polyethylene (PE), oriented polypropylene (OPP), polyamide (PA), polyethylene terephthalate (PETP), polyacetate, cellophane, polymer films (vapor-)coated with metal (e.g., aluminum) (metallized films for short) or else paper, card or metal foils, such as those of aluminum. Said foils or films can be bonded to one another, to another substrate, or to a foil or film of a :different type, e.g., polymer films to metal foils, polymer films to paper, different polymer films to one another, etc. Said foils and films can also be printed with printing inks, for example.

The polymer dispersions of the invention can be used both in adhesive formulations for high-gloss film lamination and in adhesive formulations for composite film lamination. In the case of high-gloss film lamination, paper or card is bonded to transparent polymer films. In the case of composite film lamination, the abovementioned substrates (but not paper or card), such as different polymer films, can be bonded to one another.

An advantage of the invention is that substrates of very different kinds can be bonded to one another, i.e., laminated, with the polymer dispersions of the invention ensuring good adhesion of the adhesive formulation to the substrates and resulting in high strength of the bonded composite.

Furthermore, the polymer dispersions of the invention are notable for high shear stability.

EXAMPLES

I. Preparation of The Polymers P as Aqueous Dispersions D1 to D5 and CD1 to CD4

A polymerization reactor was charged with 116 g of deionized water and 0.28 g of polystyrene seed polymer (in the form of an aqueous dispersion; $d_{50}$=30 nm) and this initial charge was heated to 85° C. 10% of the initiator feed was added to the initial charge, during which the temperature was maintained. After 5 minutes, during which the temperature was maintained, the monomer feed and initiator feed were both added to the polymerization reactor over the course of 180 minutes, beginning simultaneously. The polymerization temperature was thereafter maintained for a further 30 minutes. Then at 85° C. 5.6 g of a 10% strength by weight aqueous tert-butyl hydroperoxide solution and 7.5 g of an aqueous solution of the sodium bisulfite adduct of acetone (12% strength) were added. The mixture was subsequently cooled to room temperature and the dispersion was neutralized to a pH of 4 to 5 using 15% strength by weight sodium hydroxide solution. The solids content of the dispersion was approximately 54 to 56% by weight.

Monomer feed: aqueous emulsion of
275.0 g of deionized water
560.0 g of monomers (see Table 1)
2.24 g of emulsifier solution 1
7.47 g of emulsifier solution 2
y g of tert-dodecyl mercaptan (t-DMC; see Table 1)

Emulsifier solution 1: 60% strength by weight aqueous solution of bis-2-ethylhexylsulfosuccinic acid sodium salt Emulsifier solution 2: 45% strength by weight aqueous solution of dodecylphenoxybenzenedisulfonic acid sodium salt (DOWFAX® 2A1 from DOWCHEMICAL)

Initiator feed: solution of
2.8 g of sodium peroxodisulfate in
37.2 g of water

TABLE 1

| Dispersion | n-BuA [%][1] | EHA [%] | MMA [%] | MA [%] | AA [%] | t-DMC [%] | D[2] [nm] | Tg[3] [° C.] |
|---|---|---|---|---|---|---|---|---|
| CD1 | 84 | — | 15 | — | 1 | 0 | 293 | −27 |
| D1 | 84 | — | 15 | — | 1 | 0.10 | 274 | −28 |
| D2 | 84 | — | 20 | — | 1 | 0.15 | 292 | −29 |
| D3 | 84 | — | 15 | — | 1 | 0.20 | 278 | −30 |
| D4 | 84 | — | 15 | — | 1 | 0.25 | 296 | −31 |
| D5 | 84 | — | 15 | — | 1 | 0.30 | 288 | −32 |
| CD2 | 42 | 42 | 15 | — | 1 | 0.30 | 305 | −39 |
| CD3 | 84 | — | — | 15 | 1 | 0.30 | 279 | −35 | n-BuA = n-butyl acrylate, EHA = 2-ethylhexyl acrylate, MMA = methyl methacrylate, MA = methyl acrylate, t-DMC = tert-dodecyl mercaptan, AA = acrylic acid
[1]% by weight based on 100% by weight of monomers
[2]Average particle diameter determined using a Malvern Autosizer 2c, Malvern Instruments, England, on 0.01% strength by weight samples.
[3]Glass transition temperature (DSC, midpoint)

II. Performance Testing of Dispersions D1-D5 and CD1 to CD3

Preparation of The Composite Films:

The neutralized polymer dispersions were knife-coated in a dry layer thickness of 2–3 g/m² onto various commercially customary films (polyethylene=PE, d=100 pm, manufacturer 4P-Folien, Forchheim (DE); polypropylene, Corona-pretreated on one side=PP, d=33 am; polyethylene terephthalate=PETP, d=12 μm; aluminum, d=15 μm, manufacturers F.A.

Universal Alufolien, D. H. Korff). After drying with hot air, the films coated in this way were rolled up together with a second film (see Table 2) and subsequently pressed in a roller press under a pressure of 6.5 bar at 5 m/min and at 70° C. The composite films were subsequently stored at room temperature for 1 day under standardized climatic conditions.

b) Determination of peel strength

For this purpose the composite films obtained in accordance with a) were cut into strips 15 mm wide. The strips were subsequently subjected to peeling at 23° C. in a universal peel strength tester machine from Zwick (model 1120.25.01) at a rate of 100 mm/min and an angle of 180°, and the force required for this (in newtons) was measured. The results are compiled in Table 2.

TABLE 2

| | | Peel strength [N/15 mm] | | |
| --- | --- | --- | --- | --- |
| Example | Dispersion | PE/PP | PP/ PETP (met) | PETP/Al |
| C1 | CD1 | 1.2 | 0.7 | 1.2 |
| 1 | D1 | 1.6 | 1.0 | 1.7 |
| 2 | D2 | 1.4 | 1.2 | 1.5 |
| 3 | D3 | 1.4 | 0.9 | 1.7 |
| 4 | D4 | 2.2 | 1.6 | 2.5 |
| 5 | D5 | 1.5 | 1.1 | 2.2 |
| C2 | CD2 | 1.1 | 0.7 | 1.1 |
| C3 | CD3 | 0.6 | 0.4 | 0.7 |

PE = polyethylene
PP = polypropylene
Al = aluminum
PETP = polyethylene terephthalate
PETP(met) = Al-metallized polyethylene terephthalate

We claim:

1. A process comprising
polymerizing a monomer mixture in the presence of at least 0.01% by weight of at least one molecular weight regulator to form an aqueous polymer dispersion of a particulate polymer having a glass transition temperature $T_g$ of less than 0° C.,
wherein the polymerization is an aqueous emulsion polymerization carried out in a reaction vessel and the molecular weight regulator is added continuously to the reaction vessel during the polymerization,
wherein the monomer mixture consists essentially of
M1 from 60 to 94.9% by weight of n-butyl acrylate,
M2 from 5 to 39.9% by weight of at least one of a $C_1$ to $C_4$ alkanol ester of methacrylic acid, tert-butyl acrylate, or a vinylaromatic monomer, and
M3 from 0.1 to 5% by weight of at least one ethylenically unsaturated compound having at least one acid group,
wherein % by weight is based on 100% by weight of the monomer mixture.

2. The process as claimed in claim 1, wherein the molecular weight regulator is an organic compound having at least one thiol function.

3. The process as claimed in claim 1, wherein the monomers M3 are selected from the group consisting of α,β-ethylenically unsaturated monocarboxylic acids, α,β-ethylenically unsaturated dicarboxylic acids and mixtures thereof.

4. The process as claimed in claim 1, wherein the monomer M2 is methyl methacrylate.

5. The process as claimed in claim 1, wherein the glass transition temperature $T_g$ is from −60° C. to −10° C.

6. The process as claimed in claim 1, wherein the glass transition temperature $T_g$ is from −50° C. to −15° C.

7. The process as claimed in claim 1, wherein the glass transition temperature $T_g$ is from −40° C. to −20° C.

8. The process as claimed in claim 1, wherein the monomer M1 is n-butyl acrylate present in an amount of from 70 to 94.9% by weight, the monomer M2 is methyl methacrylaie, styrene, or both methyl methacrylate and styrene, present in an amount of from 5 to 29.9% by weight, and the monomer M3 is acrylic acid, methacrylic acid, or both acrylic acid and me thacrylic acid, present in an amount of from 0.1 to 5% by weight.

9. The process as claimed in claim 1, wherein the polymerization is carried out in the presence of a surface-active substance present in an amount of from 0.1 to 5% by weight.

10. The process as claimed in claim 1, wherein polymerizing includes continuously feeding the monomer mixture in pure or emulsified form to the reaction vessel.

11. The process as claimed in claim 1, wherein the polymerization is carried out in the presence of a seed latex.

12. The process as claimed in claim 11, wherein the seed latex is present in an amount of from 0.01 to 1.5% by weight.

13. The process as claimed in claim 1, wherein the monomers M1, M2 and M3 do not contain sulfonic acid groups.

14. The process as claimed in claim 1, wherein the molecular weight regulator and the monomer mixture are supplied continuously and separately to the reaction vessel.

15. The process as claimed in claim 1, wherein the polymerization is carried out in the presence of a free-radical polymerization initiator.

16. The process as claimed in claim 15, wherein free-radical polymerization initiator is a peroxide.

17. The process as claimed in claim 16, wherein the peroxide is an organic peroxide.

18. The process as claimed in claim 15, wherein a portion of the free-radical polymerization initiator is included with an initial charge of the monomer mixture and the molecular weight regulator in the reaction vessel, and the remainder of the free-radical polymerization initiator is supplied to the reaction vessel at the rate at which it is consumed.

19. The process as claimed in claim 1, further comprising neutralizing the polymer dispersion to a pH of from 4 to 5.

20. The process as claimed in claim 1, wherein the molecular weight regulator is tert-dodecyl mercaptan.

21. The process as claimed in claim 1, wherein the monomer mixture consists of monomers M1, M2 and M3.

* * * * *